W. H. JONES.
MAIL BAG RING.
APPLICATION FILED JAN. 29, 1913.

1,075,212.

Patented Oct. 7, 1913.

Witnesses.
Frank Waterfield
C. H. Gatchel

Inventor.
William H. Jones.
by Pham
Attorney.

UNITED STATES PATENT OFFICE.

WILLIAM H. JONES, OF MANHATTAN BEACH, CALIFORNIA, ASSIGNOR TO UNIVERSAL MAIL DISPATCHER COMPANY, OF LOS ANGELES, CALIFORNIA, A CORPORATION OF CALIFORNIA.

MAIL-BAG RING.

1,075,212.     Specification of Letters Patent.     Patented Oct. 7, 1913.

Application filed January 29, 1913. Serial No. 744,925.

*To all whom it may concern:*

Be it known that I, WILLIAM H. JONES, a citizen of the United States, residing at Manhattan Beach, in the county of Los Angeles and State of California, have invented new and useful Improvements in Mail-Bag Rings, of which the following is a specification.

Figure 1:
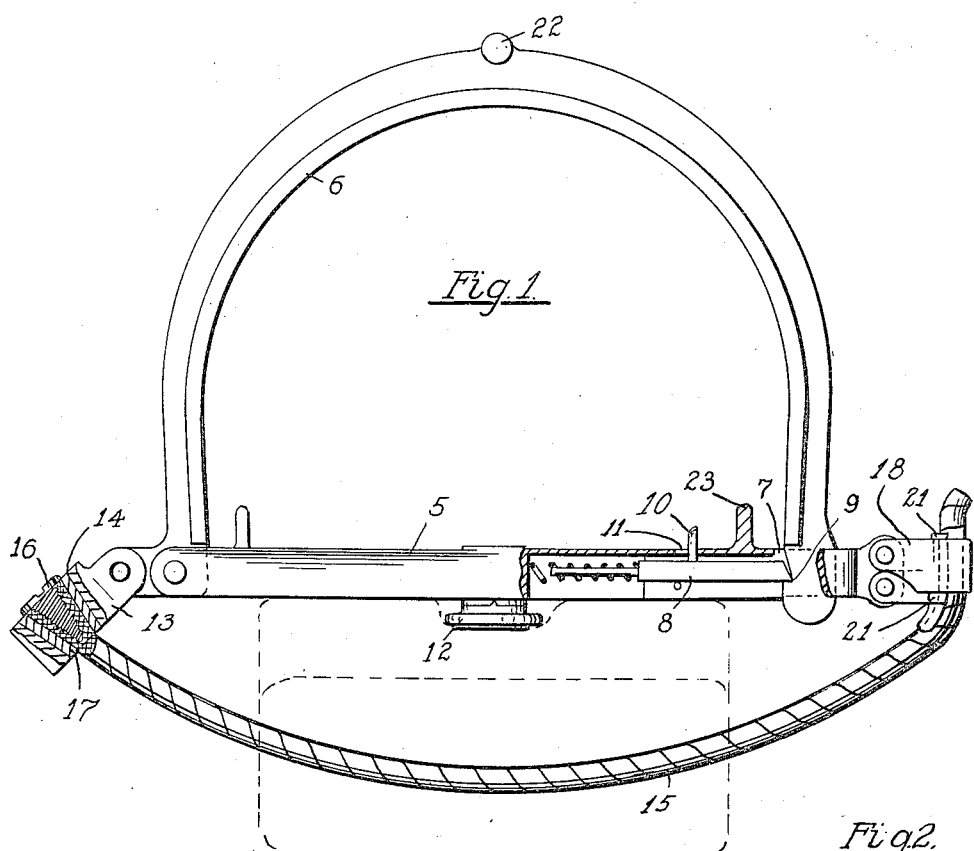
Figure 2:
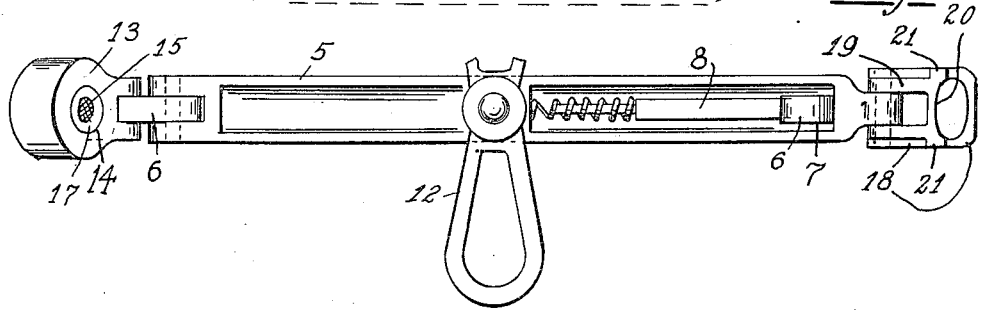
Figure 3:
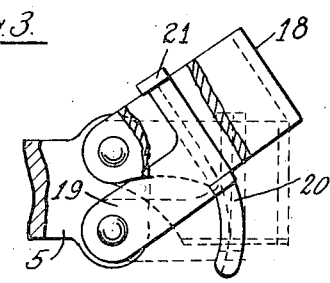

My invention relates to a ring for transferring a mail bag from one part to the other of a mail bag delivering and receiving mechanism, and the object thereof is to provide a ring to which mail bags of different sizes can be quickly attached to or detached from and which will securely hold the bag when being transferred from one part to the other. I accomplish this object by the ring described herein and illustrated in the accompanying drawings forming a part hereof in which:

Figure 1 is a side elevation, partly in section, of my improved ring. Fig. 2 is a bottom plan view of Fig. 1 with parts omitted for clearness of illustration. Fig. 3 is an enlarged side elevation of the rope securing clutch.

In the drawings 5 is the base bar in one end of which bail 6 is pivotally mounted. In the other end of the base bar is an aperture 7 through which bail 6 passes when positioned for use. The central bottom portion of the base bar is preferably provided with a trough in which is mounted a spring operated latch 8 which engages in a notch 9 in the end of bail 6 when positioned for use and locks the free end of the bail to the base bar. Latch 8 has a lug 10 which projects upwardly through a slot 11 in the base bar so that the latch can be easily unlocked when desired. To the center of the base bar is pivotally secured a bag steadying cross bar 12. To the end of bail 6 which is pivoted to the base bar is pivotally secured a rope or band socket 13 which has a hole 14 extending transversely therethrough which hole is preferably tapered. Through this hole is passed one end of a rope 15 which is prevented from coming out of the hole by a tapered screw plug 16 which is screwed into the end of the rope thereby spreading the same. For convenience I provide a tapered metal washer 17 on the end of the rope. On the opposite end of the base bar is pivotally secured clutch loop 18 and below said loop is pivotally secured a clutch bar 19 which has a grooved face 20. The clutch bar is shorter than the clutch loop and the end of the rope is passed between the ends of the bar and loop. The grooved face of the clutch bar extends above and below the clutch loop and is provided with lugs 21 above and below the clutch loop so as to cause the bar and loop to move in unison.

In the operation of my device when it is desired to secure a mail bag thereto the bail is opened to its full capacity. The steadying bar is turned across the base bar and the bag is laid on the base bar when the steadying bar is turned as described in Letters Patent No. 1,050,278. The rope is then passed around the bag and the free end threaded through the clutch loop and it is then drawn tightly on the bag. The bail is then turned to pass its free end into slot 7 where it is locked by latch 8. The bag and ring are then ready for use as set forth in my U. S. Letters Patent No. 1,050,278, issued Jan. 14, 1913. The bail is provided at its top with a lug 22 as set forth in said patent. The base bar has a holding lug 23 to aid in releasing the latch. It will be observed that by pulling upon the free end of rope 15 after it is passed through the clutch loop the rope will pass freely and as soon as it is released both the clutch loop and the bar will be carried down by the rope thereby shortening the distance between them and securely fastening the rope. When it is desired to release the bag from the ring the bail is first unlatched and turned as far as possible. The clutch loop is then turned up when the rope will slide out of the loop.

While I have shown the clutch loop and bar as part of a mail bag ring it is obvious that it may be used in other devices and I do not limit myself to its use in a mail bag ring.

Having described my invention what I claim is:

1. A clutch for ropes comprising a clutch loop and a clutch bar pivotally mounted to a common base with the loop above the bar, the bar being shorter than the loop and having a face that extends into and through the loop.

2. In a mail bag ring a clutch for ropes comprising a clutch loop and a clutch bar pivotally mounted to a common base with the loop above the bar, the bar being shorter than the loop and having a face that extends into and through the loop.

3. A mail bag ring comprising a base bar having an aperture near one end thereof; a bail pivotally secured to the base bar and having its free end provided with a notch and adapted to pass through the aperture in the base bar; a spring locking latch mounted in said base bar to lock said bail; rope attaching means secured to said bail; and a rope clutch mounted on the end of the base bar opposite to the end to which the bail is pivotally secured.

4. A mail bag ring comprising a base bar having a slit and an aperture therethrough near one end; a bail having a notch in one end thereof pivotally mounted on the base bar at the end opposite the aperture; a spring operated latch mounted on the base bar at the aperture therein, said latch having a lug extending through the slit in the base bar; a lug having a transverse tapered aperture therein pivotally mounted on the end of the bail; a rope in said aperture; a tapered screw in the end of said rope; and a rope clutch mounted on the end of the base bar having the aperture therein, said clutch comprising a clutch loop, pivotally secured to said base bar and a clutch bar pivotally secured to said base bar at a point below the pivot of the loop, said bar being shorter than the loop and having a face extending through the loop.

In witness that I claim the foregoing I have hereunto subscribed my name this 23rd day of January, 1913.

WILLIAM H. JONES.

Witnesses:
G. E. HARPHAM,
FRANK WATERFIELD.

---

Copies of this patent may be obtained for five cents each, by addressing the " Commissioner of Patents, Washington, D. C."